May 6, 1952  P. J. SMOLA  2,595,420
GRASS CATCHER FOR LAWN MOWERS
Filed Jan. 6, 1950  2 SHEETS—SHEET 1
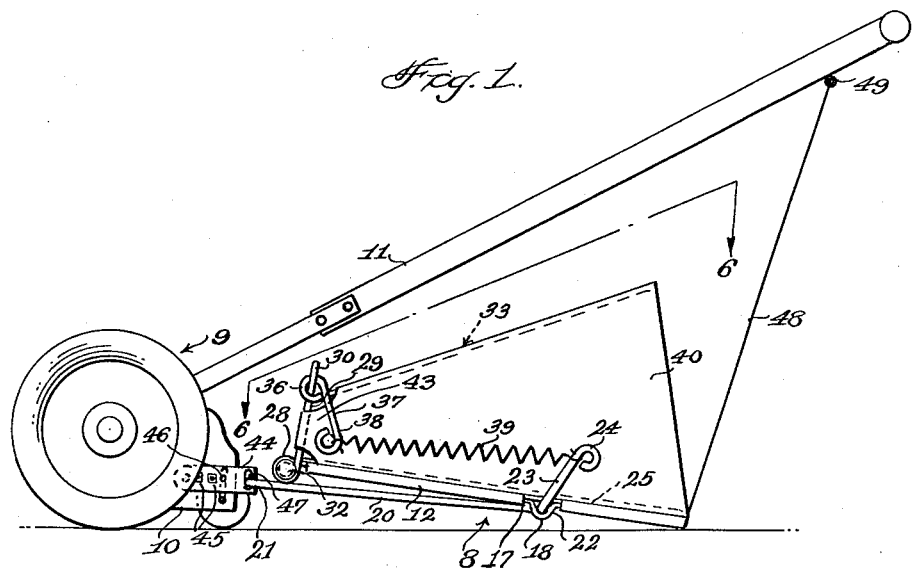
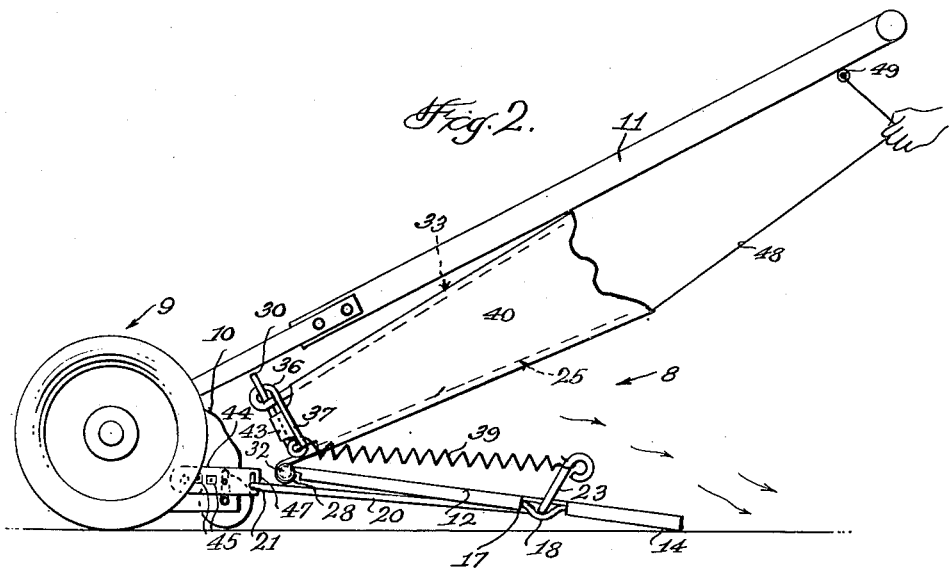
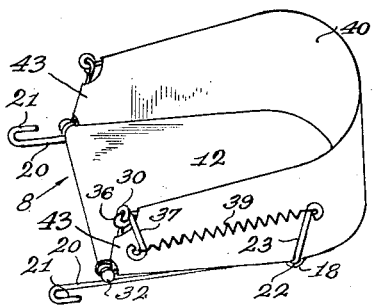
Inventor
Paul J. Smola
By John N. Randolph
Attorney May 6, 1952 P. J. SMOLA 2,595,420
GRASS CATCHER FOR LAWN MOWERS
Filed Jan. 6, 1950 2 SHEETS—SHEET 2
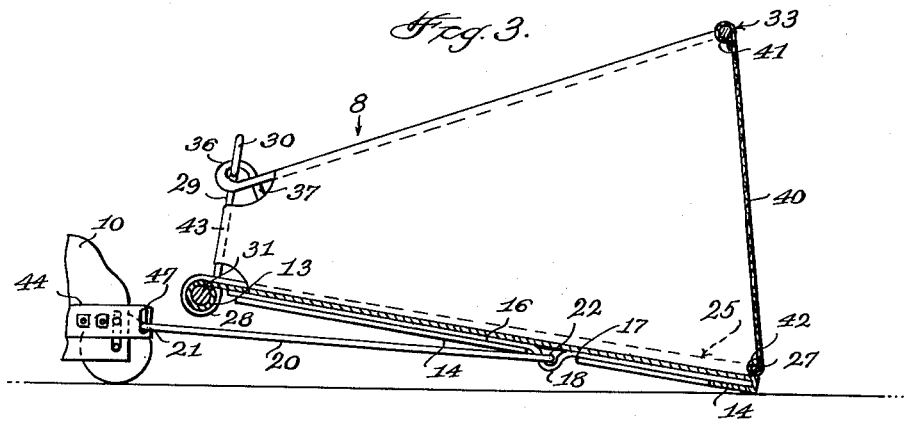
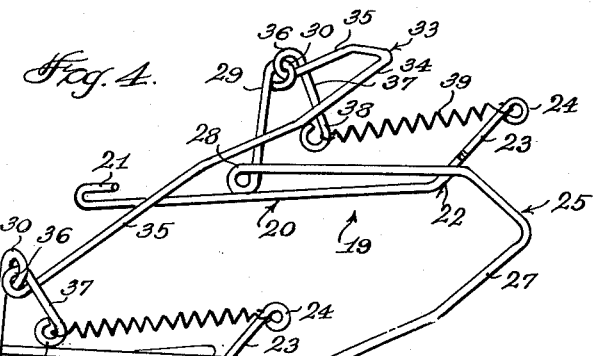
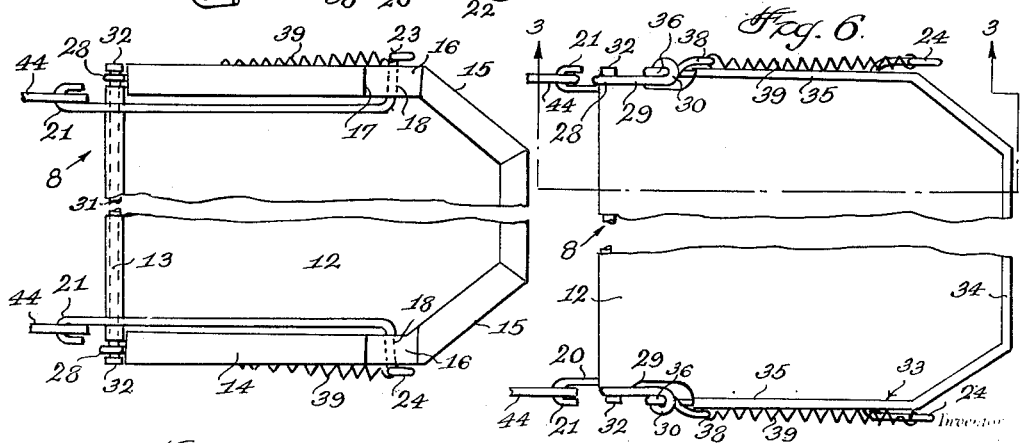
Paul J. Smola
By John N. Randolph
Attorney Patented May 6, 1952

2,595,420

UNITED STATES PATENT OFFICE 2,595,420

GRASS CATCHER FOR LAWN MOWERS

Paul J. Smola, Edwardsville, Ill.

Application January 6, 1950, Serial No. 137,126

9 Claims. (Cl. 56—199)

This invention relates to a novel construction of grass catcher adapted to be attached to a conventional lawn mower for catching the grass clippings cut by the mower blades and discharged rearwardly therefrom.

It is a primary object of the present invention to provide a grass catcher from which the cut grass can be readily discharged without removing the catcher from the lawn mower and if desirable while the lawn mower is in motion so that the grass may be conveniently stacked in a windrow to be conveniently racked up and disposed of.

Another object of the invention is to provide a grass catcher capable of being quickly and easily applied to or removed from a lawn mower and which includes a pivotally mounted bottom the forward end of which may be elevated for discharging the cut grass from the rear end of the catcher and a retaining wall which may be elevated for exposing the rear end of the bottom for accomplishing the discharging of the grass.

Still a further object of the invention is to provide a grass catcher having yieldable means for normally retaining the side walls and rear end wall in an extended and closed position and which will function to return the walls to said closed position and for elevating the rear end of the catcher bottom after the cut grass has been discharged therefrom.

Still a further object of the invention is to provide a grass catcher including a novel frame formed of pivotally connected sections for supporting flexible walls of the grass catcher and having yieldable means for normally retaining the frame in an extended position for maintaining said walls in normal, extended positions.

Various other objects and advantages of the invention will hereinafter become more fully apparent from the following description of the drawings, illustrating a presently preferred embodiment thereof, and wherein:

Figure 1 is a side elevational view showing the grass catcher applied to a conventional lawn mower and disposed in a normal, operative position;

Figure 2 is a view similar to Figure 1 but showing the grass catcher in a partially opened position for discharging grass therefrom;

Figure 3 is a longitudinal sectional view through the grass catcher and taken substantially along a plane as indicated by the line 3—3 of Figure 6;

Figure 4 is a perspective view of the grass catcher frame;

Figure 5 is a bottom plan view of the grass catcher;

Figure 6 is a top plan view, partly broken away, of the grass catcher, and

Figure 7 is a perspective view thereof.

Referring more specifically to the drawings, for the purpose of illustrating an application and use of the grass catcher, designated generally 8 and comprising the invention, a conventional lawn mower is illustrated in Figures 1 and 2 and designated generally 9 and includes a frame 10 and a handle 11. The handle 11 is pivotally mounted in a conventional manner on the frame 10 for swinging movement in a vertical plane.

The grass catcher 8 includes a bottom 12 which may be formed of a relatively light yet substantially rigid sheet metal material. At the forward end of the bottom 12, the sheet metal is rolled under to provide a transversely extending sleeve portion 13, as best seen in Figure 5. The side edges and rear end of the bottom 12 are folded under to provide a reinforcing and rigidifying frame 14. The corners at the rear end of the bottom 12 are preferably cutoff diagonally as seen at 15, for a purpose which will hereinafter become apparent. Elongated strips 16, preferably of a material corresponding to the bottom 12 are disposed between said bottom and its inturned flanges 14 for further reinforcing the side edges and rear end of the bottom and said flanges 14 have cut out portions 17 in the sides thereof and adjacent the diagonally cutoff rear end portion 15 for exposing portions of said reinforcing strips 16. The exposed portions of the reinforcing strips 16 include aligned downwardly offset arcuate portions forming bearings 18.

The grass catcher 8 also includes a wire frame, designated generally 19 and best illustrated in Fig. 4 and which is formed of a relatively heavy gauge wire and includes corresponding supporting members 20 each formed of a single strand of wire. The supporting members 20 have outwardly turned back forward ends forming hooks 21 and adjacent their rear ends are provided with outturned portions 22 which extend in directions away from one another and at right angles to the portions of the supporting members 20 which are disposed between the hooks 21 and said portions 22. Said portions of the supporting members 20, disposed between the hooks 21 and the portions 22 are adapted to be disposed beneath the catcher bottom 12 and the portions 22 thereof extend outwardly through the bearings 18 and are journaled therein, as best illustrated in Figure 5, for pivotally supporting the bottom 12 on the supporting members 20. The supporting members 20, beyond said portions 22 thereof include arms 23, constituting the opposite ends thereof and which extend upwardly at an oblique angle and in a direction away from the hooks 21. Each of the arms 23 terminates in an eye 24.

The frame 19 also includes a modified U-shaped member, designated generally 25, the intermediate portion of which generally corresponds in shape to the rear end of the bottom 12, as best seen in Figure 4 and which additionally includes substantially parallel, forwardly extending legs 26 which form integral extensions of the ends of said intermediate portion 27 of the frame member 25. The legs 26 terminate in transversely aligned loops or eyes 28 each of which has an integral extension forming an upwardly extending arm 29 which in turn terminates in a loop forming an eye 30. The eyes 30 constitute the terminals of the frame member 25. A shaft 31 extends through the sleeve 13 of the bottom 12 and is provided with headed ends 32 which are spaced from the ends of the sleeve 13. The eyes 28 pivotally engage the shaft 31, one between each end of the sleeve 13 and the adjacent head 32 for pivotally mounting the frame member 25 on the forward end of the catcher bottom 12 for swinging movement of the frame member upwardly and downwardly relatively to the bottom 12.

A second frame member 33 includes a substantially U-shaped portion including an intermediate part 34 and legs 35 which correspond substantially in shape to the parts 27 and 26, respectively, of the frame member 25. The legs 35 terminate at their forward ends in laterally disposed loops forming eyes 36 which are interengaged with the eyes 30 of the arms 29 for pivotally mounting the frame 33 on the upper ends of said arms 29. The terminals of the strand of wire forming the frame 33 extend downwardly from the eyes 36 to form levers 37 which extend downwardly and rearwardly relatively to the interengaged eyes 30 and 36 and each of which levers 37 terminate in a loop forming an eye 38. The eyes 24 and 38 which are disposed on each side of the grass catcher 8 are connected by a contractile coil spring 39, which springs urge the arms 23 and levers 37 to swing toward one another, for a purpose which will hereinafter become apparent.

The grass catcher 8 also includes a flexible wall, preferably formed of a fabric such as canvas and which is designated generally 40 and the upper edge portion of which is looped and secured around the portions 34 and 35 of the upper frame 33, as seen at 41, and the bottom edge of which is similarly looped and secured around the portions 26 and 27 of the bottom frame 25, as seen at 42. The canvas member 40 constitutes the side walls and rear wall of the grass catcher 8 and is tapered in width toward each of the ends thereof and has restricted extensions 43 at its ends which are secured around the intermediate portions of the upwardly extending arms 29, as illustrated in Figures 1, 2 and 3.

The grass catcher 8 is preferably mounted detachably on the lawn mower 9 by means of a pair of elongated bars 44 one of which is secured to each side of the lawn mower frame 10 by two nut and bolt fastenings 45 which selectively engage longitudinally spaced openings 46 in said bars 44, by which said bars may be longitudinally adjusted with respect to the frame 10. Each bar 44 is provided adjacent its rear end with a transversely or vertically elongated opening 47 for selectively engaging one of the hooks 21 and in which the hooks pivot. The openings 47 are of sufficient length so that by swinging the supporting members 20 to positions for aligning the hooks 21 with said openings 47, will enable the hooks 21 to be disengaged from the openings 47 or engaged therewith thus preventing accidental detachment of the grass catcher from the strap members 44 when the lawn mower and grass catcher are in normal positions, as illustrated in Figures 1, 2 and 3.

A cord or flexible member 48 is secured at one end to the intermediate portion 27 of the lower frame member 25 and extends upwardly therefrom and is secured by an eye member 49 to the underside of the lawn mower handle 11, adjacent its upper grip end.

Assuming that the grass catcher 8 is mounted on the lawn mower 9, as illustrated in Figures 1 and 3, when so disposed it is in its normal position for catching grass clippings, not shown, thrown rearwardly from the cutting blades, not shown, of the lawn mower 9 in a conventional manner and the grass catcher bottom 12 normally slopes downwardly and rearwardly to prevent the grass clippings from escaping from the catcher through the open front end thereof. Instead of having to disconnect the grass catcher from the lawn mower, after it has been filled, as is conventional, when the grass catcher 8 is substantially filled with grass in order to empty the grass therefrom it is only necessary for the operator to grasp the flexible member 48 and pull upwardly thereon which will cause the lower frame member 25 to be swung upwardly on its pivot 31 and carrying with it the fabric wall 40 and the upper frame member 33. The springs 39 resist this upward movement of the frame member 33 and said upper frame member will strike the underside of the handle 11 which will limit its upward movement, so that the frame members 25 and 33 will be displaced toward one another thereby partially collapsing the fabric wall 40. It will be apparent as illustrated in Figure 2 that this will expose the rear end of the grass catcher so that the grass can escape therefrom over the restricted rear end portion of the catcher bottom 12. By continuing to pull on the flexible member 48 after the frame members 25 and 33 have reached their positions of Figure 2 will cause the bottom 12 to pivot on the portions 22 of the supporting members 20 thereby causing the forward end of the bottom 12 to rock upwardly and to cause the supporting members 20 to swing upwardly on the bracket 44 for tilting the catcher bottom 12 at a greater angle to insure a complete emptying of the catcher. When pressure is released on the flexible member 48 the bottom 12 will initially swing back to its position of Figure 2 and the weight of the frames 25 and 33 and of the wall 40 will cause said parts to swing downwardly and back to their positions of Figures 1 and 3. However, the tension of the springs 39 will urge the frame 33 upwardly with respect to the frame 25 for holding the fabric wall 40 in an extended position. It will be readily apparent that the grass clippings will thus be readily emptied while the lawn mower is in use and the operator thereof may empty the grass clippings in piles to form a windrow and from which the grass clippings can be readily raked up and disposed of.

The corners 15 of the rear end of the bottom 12 are cut off so that in piling the grass in a windrow, as previously described, said cutoff corners 15 will not hit and spread grass from a pile previously emptied.

Various modifications and changes are contemplated and may obviously be resorted to, without departing from the spirit or scope of the invention as hereinafter defined by the appended claims.

I claim as my invention:

1. A grass catcher for lawn mowers comprising complementary supporting members adapted to be pivotally and detachably supported by the frame of a lawn mower and extending rearwardly therefrom, a grass catcher bottom mounted on said supporting members and pivotally connected thereto near the rear end of the catcher bottom for pivotal movement of the catcher bottom in substantially a vertical plane, a substantially U-shaped bottom frame having forwardly extending legs pivotally connected at their forward ends to the catcher bottom at the forward end thereof, said frame having integral upwardly extending arms projecting from the forward ends of the legs thereof, a substantially U-shaped upper frame having forwardly extending legs pivotally connected at their forward ends to the upper ends of the arms of the lower frame, said upper frame having integral lever members depending from the forward ends of the legs thereof, a fabric wall member supported by said frames and including a bottom edge secured to the lower frame, a top edge secured to said upper frame and restricted end portions secured to the upwardly extending arms of the lower frame, said fabric wall defining the rear and side walls of the grass catcher and extending substantially co-extensively with the side edges and rear edge of the catcher bottom, and contractile springs connecting the depending ends of the lever members of the upper frame and rear end portions of said supporting members and which are disposed rearwardly of said levers for normally urging the upper frame to rock upwardly relatively to the lower frame to retain said fabric wall in an extended position.

2. A grass catcher as in claim 1, and a flexible member connected to and extending upwardly from the rear portion of said lower frame and adapted to be manually pulled for swinging the upper and lower frames and the fabric wall upwardly relatively to the rear end of the catcher bottom for exposing said catcher bottom at its rear end for discharging the contents of the grass catcher therefrom.

3. A grass catcher as in claim 1, and a flexible member connected to and extending upwardly from the rear portion of said lower frame and adapted to be manually pulled for swinging the upper and lower frames and the fabric wall upwardly relatively to the rear end of the catcher bottom for exposing said catcher bottom at its rear end for discharging the contents of the grass catcher therefrom and for exerting a pull on the forward end of the catcher bottom by the connection of the lower frame thereto for rocking said catcher bottom on its pivot for elevating the forward end thereof.

4. A grass catcher as in claim 1, a pair of strap members adapted to be detachably and adjustably secured to the sides of the lawn mower frame and having portions extending rearwardly therefrom and provided with transversely elongated openings, said supporting members having elongated hook portions at their forward ends for pivotally engaging said openings and which are detachable therefrom only when said supporting members are disposed transversely to the longitudinal axis of the strap members.

5. A grass catcher comprising complementary supporting members adapted to be detachably supported by a lawn mower frame and extending rearwardly therefrom, a substantially rigid catcher bottom supported on said supporting members, a wire frame formed of upper and lower substantially U-shaped sections, said lower frame section having forwardly extending leg portions pivotally connected at their forward ends to the forward end of the catcher bottom and adjacent the side edges thereof and being provided with integral upwardly extending arms engaged by the legs of the upper frame section and supporting the upper frame section above said lower frame section, said lower frame section extending substantially co-extensive with the side edges and rear end of the catcher bottom, and a flexible wall member secured along its bottom edge to the U-shaped lower frame section and along its top edge to the U-shaped upper frame section and forming the side walls and rear wall of the grass catcher, said lower frame section being swingable on its pivotal connection to the catcher bottom for moving the frame upwardly and away from the catcher bottom for exposing the rear end of the catcher bottom beneath the lower frame section.

6. A grass catcher as in claim 5, said catcher bottom having a restricted rear end portion.

7. A grass catcher as in claim 5, said upper frame section being pivotally connected to the upper ends of the arms of the lower frame section, and spring means connected to the upper frame section and said supporting members for rocking said upper frame section on its pivot and in a direction away from the lower frame section for holding the flexible wall in an extended position.

8. A grass catcher as in claim 5, and a flexible member extending from the intermediate, rear portion of the lower frame section and adapted to be manually pulled for elevating the frame and flexible wall relatively to the rear portion of the catcher bottom.

9. A grass catcher as in claim 5, said upper frame section being pivotally connected to the upper ends of the arms of the lower frame section, and spring means connected to the upper frame section and said supporting members for rocking said upper frame section on its pivot and in a direction away from the lower frame section for holding the flexible wall in an extended position and for exerting an upward pull on the forward end of the catcher bottom.

PAUL J. SMOLA.

REFERENCES CITED

The following references are of record in the file of this patent:

UNITED STATES PATENTS

| Number | Name | Date |
| --- | --- | --- |
| 530,084 | Bubier | Dec. 4, 1894 |
| 824,717 | Hann | July 3, 1906 |